United States Patent
Hu et al.

(10) Patent No.: US 7,742,320 B2
(45) Date of Patent: Jun. 22, 2010

(54) METHOD AND APPARATUS FOR REGULATING POWER IN A FLYBACK CONVERTER

(75) Inventors: Jing Hu, Neubiberg (DE); Kok Kee Lim, Singapore (SG); Meng Kiat Jeoh, Singapore (SG); Xiao Wu Gong, Singapore (SG); Yi He, Wellington Circle (SG)

(73) Assignee: Infineon Technologies AG, Neubiberg (DE)

(*) Notice: Subject to any disclaimer, the term of this patent is extended or adjusted under 35 U.S.C. 154(b) by 474 days.

(21) Appl. No.: 11/745,089

(22) Filed: May 7, 2007

(65) Prior Publication Data
US 2008/0278225 A1    Nov. 13, 2008

(51) Int. Cl.
    *H02M 3/335*    (2006.01)
    *G05F 1/40*    (2006.01)
(52) U.S. Cl. .............. 363/21.12; 363/97; 323/284
(58) Field of Classification Search ............ 363/21.01, 363/21.12, 21.17, 21.18, 97, 131; 323/271, 323/284, 351
See application file for complete search history.

(56) References Cited

U.S. PATENT DOCUMENTS

| | | | | |
|---|---|---|---|---|
| 5,049,792 | A * | 9/1991 | Oh ........................... | 315/411 |
| 6,252,783 | B1 * | 6/2001 | Huh et al. ................. | 363/21.01 |
| 6,469,914 | B1 * | 10/2002 | Hwang et al. ............ | 363/21.01 |
| 7,529,105 | B1 * | 5/2009 | Choi et al. ............... | 363/21.12 |
| 2006/0285366 | A1 * | 12/2006 | Radecker et al. .............. | 363/16 |

* cited by examiner

*Primary Examiner*—Jessica Han
(74) *Attorney, Agent, or Firm*—Schwegman Lundberg & Woessner, P.A.

(57) ABSTRACT

An integrated circuit includes an operational amplifier configured to receive a current sense voltage ($V_{CS}$) at a first input and an offset voltage at a second input. A comparator is coupled to the operational amplifier and adapted to receive at a first input an output voltage signal ($V_{OUT}$) of the operational amplifier. A voltage limiting circuit is configured to receive a regulation voltage. A fold back correction circuit is coupled to the voltage limiting circuit and to a second input of the comparator. A pulse width modulator circuit is coupled to the comparator and is adapted to receive the output of comparator.

19 Claims, 7 Drawing Sheets

METHOD AND APPARATUS FOR REGULATING POWER IN A FLYBACK CONVERTER

BACKGROUND

Some electronic devices operate only a few hours during the day, and are consequently in standby power mode during the rest of the day. Standby power is the power used while an electronic device is in its lowest power mode. Lowering the standby power consumption results in saving of considerable amount of energy. Switch Mode Power Supply (SMPS) allows for efficient power conversion in electronic equipment. SMPS, even with the output unloaded, consume a large amount of power because during every oscillator cycle the power switch is turned on and off. The switch losses associated with turning the switch on and off have an impact on the system standby power.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
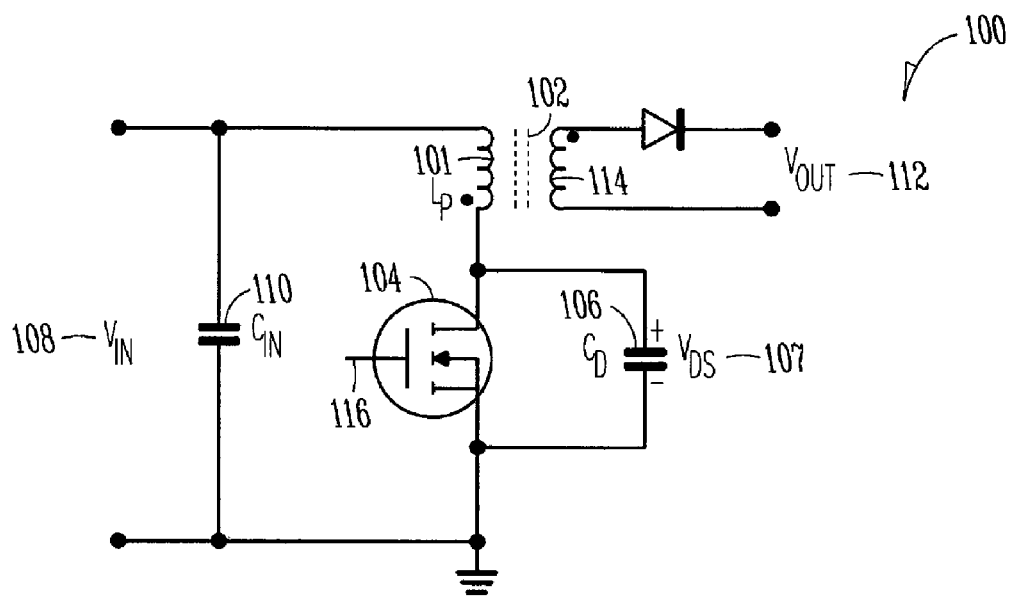
FIG. 1 is a schematic view of a quasi-resonant flyback power stage circuit, according to an example embodiment.

FIG. 1 illustrates schematic view of a quasi-resonant flyback power stage circuit 100. As shown in FIG. 1, a primary side 101 of a transformer 102 has an inductance Lp. A MOSFET 104 is coupled to primary side 101 and has an equivalent drain-source capacitance 106 of $C_d$. A drain-source voltage, ($V_{ds}$) 107 is illustrated across capacitance 106. An input voltage 108 is indicated by $V_{in}$ across an input capacitance $C_{in}$ at 110.

Quasi-resonant flyback converters are widely used in off-line power supplies. They have the advantages of providing low EMI and high efficiency in power conversion. A flyback converter is an isolated power converter. Therefore, isolation of a control circuit for the converter is needed. In order to control an output voltage 112 across the output capacitor, a proper voltage signal related to it is desired. A primary side feedback control can be used for DCM (discontinuous conduction mode) operation, because in this case, the output voltage is in proportion to the turn-on and reset time of the transformer at a constant output load. This voltage can be picked up from a separate sense winding. More often, and for the CCM (continuous conduction mode) operation, however, the output voltage is sensed and compared to a reference, signaling the controller through an opto-coupler to maintain isolation.

Figure 2:
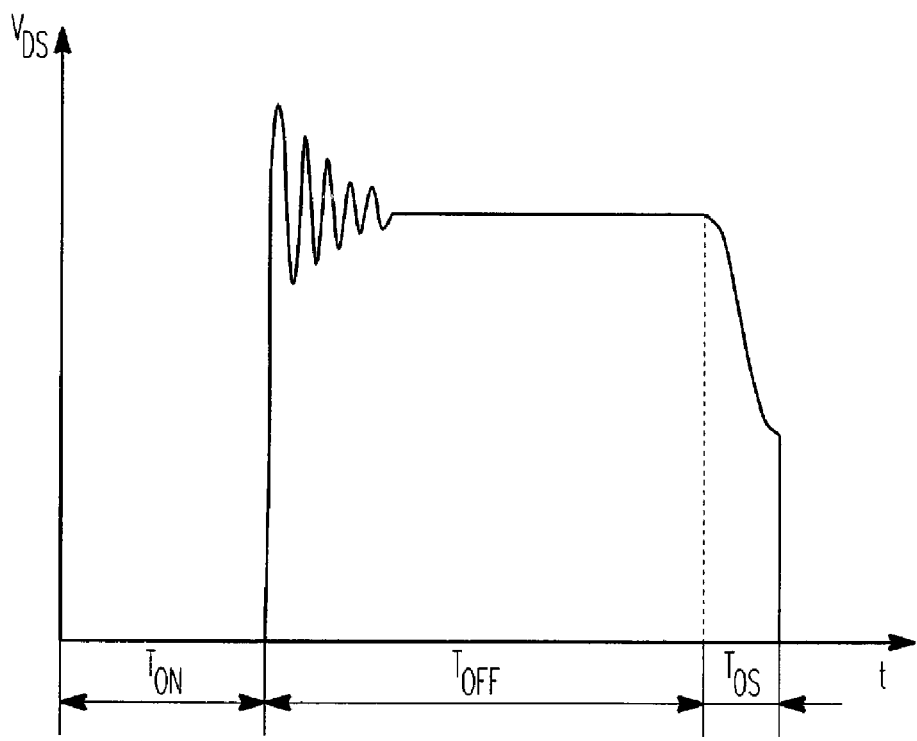
FIG. 2 illustrates a waveform showing a drain-source voltage of a MOSFET shown in FIG. 1 that is turned ON at a first zero crossing, according to an example embodiment.

FIG. 2 illustrates a waveform showing the drain-source voltage 107 of MOSFET 104 shown in FIG. 1, according to some embodiments. FIG. 2 shows the drain-source voltage 107 in MOSFET 104 during a typical quasi-resonant operation where MOSFET 104 is turned on by providing a voltage to a MOSFET gate 116 at the first valley of the resonance caused by $L_p$ and $C_d$. Several basic equations for quasi-resonant flyback converters can be written based on the circuit in FIG. 1 and the waveform in FIG. 2.

The peak current in the primary winding 101 of the transformer 102 is $$I_{P-PK} = \frac{V_{in}}{L_P} T_{ON} \quad (1)$$

Assuming the turns ratio of the transformer is N, the off time shown in FIG. 2 can be obtained as $$T_{OFF} = \frac{V_{in}}{N * V_{out}} T_{ON} \quad (2)$$

$T_{os}$ is half of the oscillation period of the primary inductance and drain-source capacitance $$T_{OS} = \pi * \sqrt{L_P * C_d} \quad (3)$$

The switching frequency of the converter is $$f_S = \frac{1}{T_{ON} + T_{OFF} + T_{OS}} \quad (4)$$

The input power of the converter is $$P_{in} = 0.5 * L_p * I_{P-PK}^2 * f_S \quad (5)$$

The switching frequency, the input power and the input voltage are related to each other, while the ON time of the MOSFET is controlled by the feedback, normally. Generally, at maximum input power $P_{inMAX}$, and minimum input voltage $V_{inMIN}$, $f_s$, will reach the least value and the peak current in primary winding is the largest. Such a case normally defines the design constraints of the system. In general, primary inductance will be chosen at this condition with selected minimum switching frequency given by the relation in Equation (6):

$$L_{P-MAX} = \frac{1}{\left[\frac{1}{V_{inMIN}} * \left(1 + \frac{V_{inMIN}}{N * V_{out}}\right) * \sqrt{2 P_{inMAX} f_{SMIN}} + \pi * f_{SMIN} * \sqrt{C_d}\right]^2} \quad (6)$$

Under conditions of light loads, the switching frequency will increase and can cause considerable drop in efficiency. In some embodiments, digital frequency reduction can be used so that the MOSFET is turned on upon the detection of the second, or third valley of the drain-source voltage of the MOSFET, which accordingly can be realized by check the zero crossing (ZC) of a voltage from an auxiliary winding, which is coupled to the other windings of the power transformer. In some embodiments, the MOSFET is turned on based on the detection of either fourth, fifth, sixth, seventh or even higher ZC.

Figure 3:
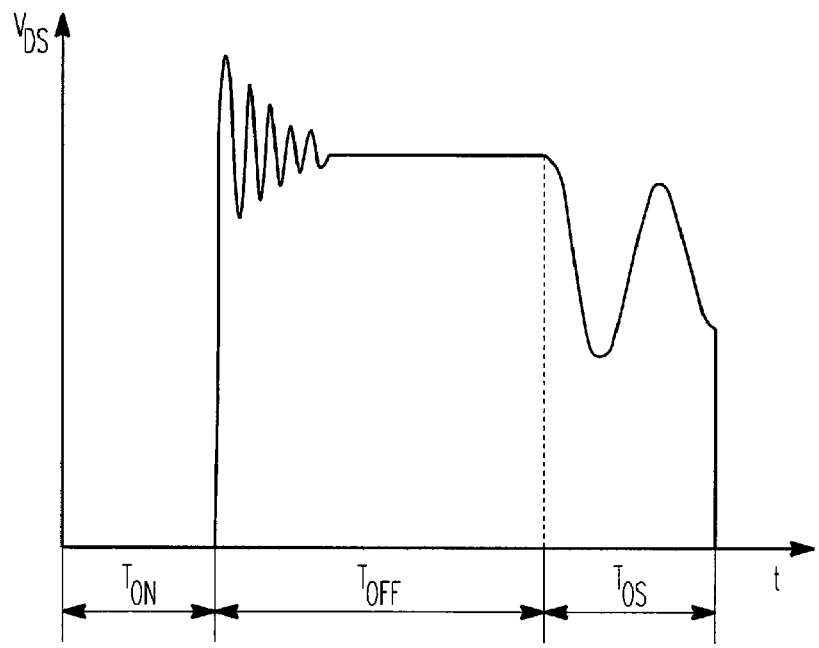
FIG. 3 illustrates a waveform showing the drain-source voltage of the MOSFET that is turned ON at a second zero crossing, according to an example embodiment.

FIG. 3 illustrates a waveform showing the drain-source voltage of MOSFET 104 shown in FIG. 1 that is turned ON at a second zero crossing, according to some embodiments of the invention.

Figure 4:
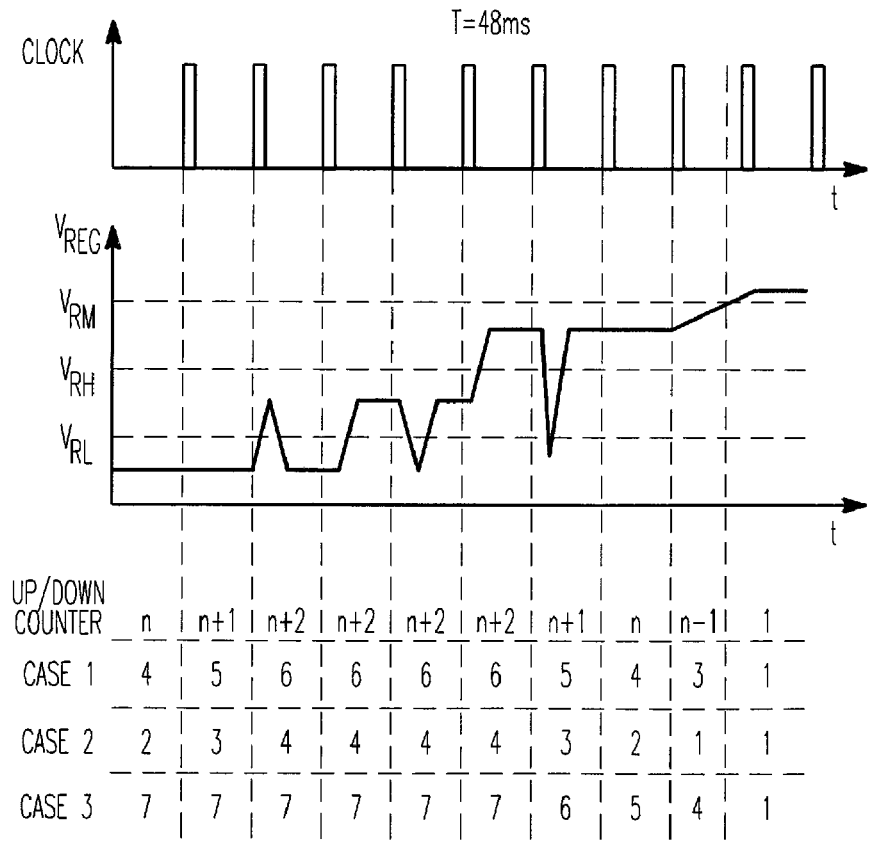
FIG. 4 illustrates some examples of zero crossing up/down counter changes with regulation voltage, according to an example embodiment.

In some embodiments of the invention, a ZC up/down counter stores the number of zero crossing to be ignored before the main power switch (MOSFET) is switched-on after demagnetization of the transformer. This ZC up/down counter stores a value that is a function of the regulation voltage, which contains information about the output power. Generally, a high output power results in a high regulation voltage. Accordingly, the value in the up/down counter is changed to a low value in case of high regulation voltage, and to a high value in the case of low regulation voltage. In some embodiments, the lowest value of the counter is 1 and the highest value is 7. The regulation voltage $V_{REG}$ is internally compared with three thresholds $V_{RL}$, $V_{RH}$ and $V_{RN}$. According to the results, the value in the up/down counter is changed in accordance with rules summarized in Table 1, with results illustrated in FIG. 4. According to the comparison results the up/down counter counts upwards, stays unchanged or counts downwards. However, the value in up/down counter in one embodiment is limited between 1 and 7. If the counter attempts to count beyond this range, the attempt is ignored. In some embodiments, the up/down counter is changed by one each time at the clock period of 48 ms. However, to ensure a fast response to sudden load increase, the counter may be set to 1 in the following switching period after the regulation voltage $V_{REG}$ exceeds the threshold $V_{RM}$.

TABLE 1

Rules for ZC up/down counter change

| CONDITION | UP/DOWN COUNTER ACTION |
|---|---|
| $V_{REG}$ always lower than $V_{RL}$ | +1 (maximum 7) |
| Once $V_{REG}$ higher than $V_{RL}$, but always lower than $V_{RH}$ | Stop counting, no change in value |
| Once $V_{REG}$ higher than $V_{RH}$, but always lower than $V_{RM}$ | −1 (minimum 1) |
| Once $V_{REG}$ higher than $V_{RM}$ | Set to counter to 1, immediately |

In some embodiments, voltage $V_{RM}$ is equal to 3.9V, voltage $V_{RH}$ is equal to 3.2V and voltage $V_{RL}$ is equal to 2.5V.

The regulation voltage reflects the output power requirements. This kind of control is called feedback control. The current sense voltage, $V_{CS}$, is amplified and have an offset added to it. This voltage will be used for comparison with regulation voltage to determine when the MOSFET will be turned off. In some embodiments, the maximum current sense voltage $V_{CS}$ is 1V. In some embodiments, the OP/AMP is present within an IC and the maximum regulation voltage is 3.8V based on Equation (7):

$$V_{REG} = 3.2 * V_{CS} + 0.6 \quad (7)$$

As a result, voltage $V_{REG}$=3.8V would mean the presence of maximum power requirement that can only be achieved at first zero crossing. At other zero crossings, the maximum power would be different because the maximum regulation voltage is 3.2V, otherwise, ZC up/down counter will be decreased until 1. Similarly, the ZC up/down counter is also changed at power levels in relation to the regulation voltage, in other words, in proportional to the output power. The regulation voltage may also have a further function. When the IC operates at $7^{th}$ zc and $V_{REG}$ is lower than 1.1V, the IC will enter active burst mode operation for power saving.

Unlike in traditional DCM (discontinuous conduction mode) fixed-frequency flyback converters, controllers for quasi-resonant flyback converters may utilize a ZC pin for zero crossing detection. In addition, quasi-resonant flyback converters have one typical property: the maximum output power capability increases as the input voltage increases. This property is shown by following equations.

$$D = \frac{V_{refl}}{V_{in} + V_{refl}} \Rightarrow \frac{V_{refl}}{V_{in}} = \frac{D}{1-D} \quad (8)$$

$$V_{in} D = V_O \frac{N_P}{N_S}(1-D) = V_{refl}(1-D) \quad (9)$$

$$P_{in} = V_{in} \cdot i_{in-dc} = V_{in} \cdot (0.5 i_{p-pk} D) \quad (10)$$

$$P_{out} = \eta P_{in} = \frac{1}{2} \eta V_{in} i_{p-pk} D = \frac{1}{2} \eta V_{refl}(1-D) i_{p-pk} \quad (11)$$

As shown in equation (10), "1-D" will increase when input voltage increases. To keep a constant output power capability, the maximum current limit in the transformer primary winding 101 decreases when input voltage increases.

Figure 5:
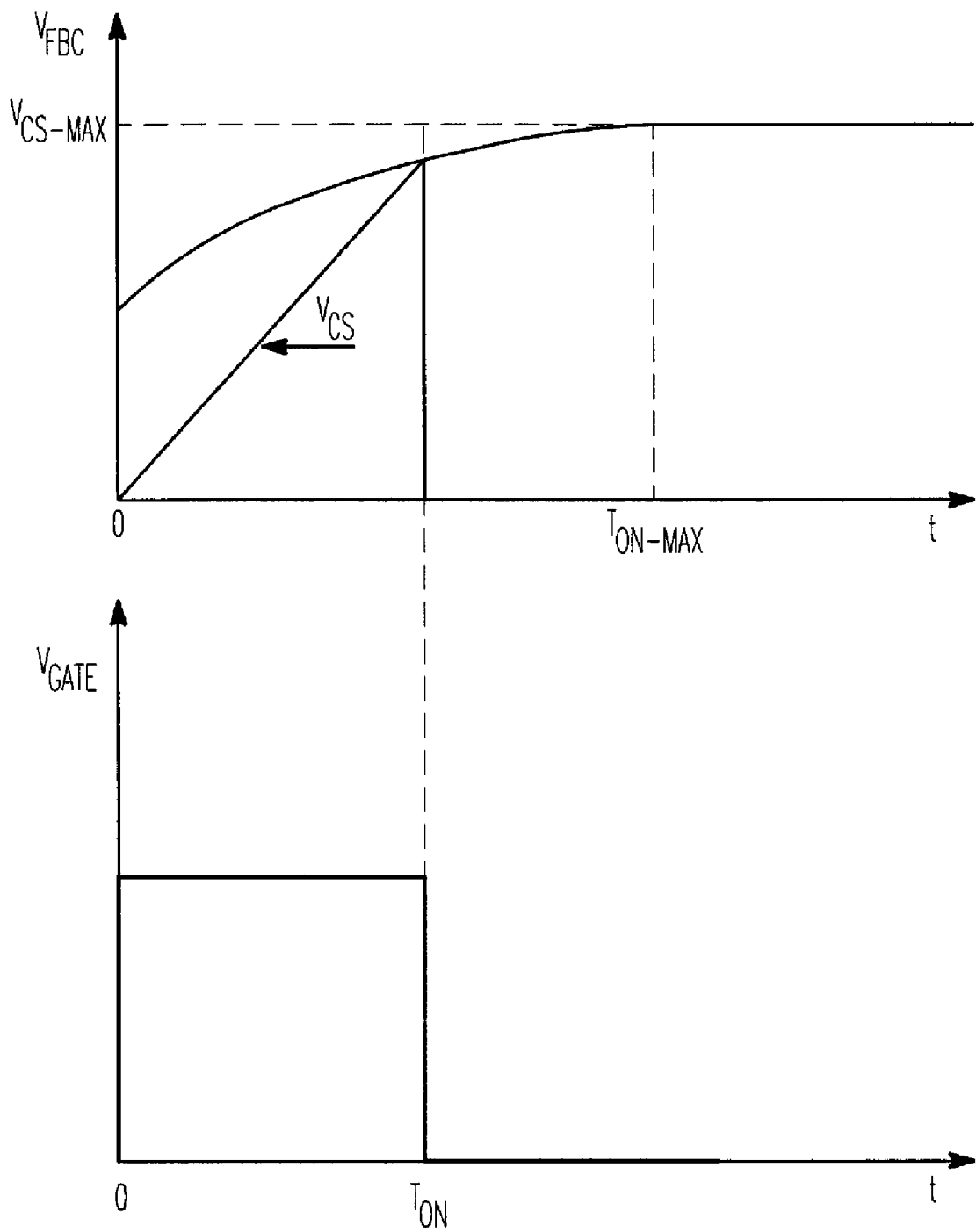
FIG. 5 is a diagram of a fold back correction curve implemented on the current sense voltage, according to an example embodiment.

In practical application, the function for limiting the maximum output power against input voltage variations is called fold back correction. In some embodiments, a fixed fold back correction curve is used as shown in FIG. 5. The time $T_{on-max}$ is the maximum on-time according to lowest input voltage at full load and the selected switching frequency. However, for different applications, the selected switching frequency and then the maximum on-times are different. A fixed fold back correction is suitable for a small range of applications designed with approximately the same minimum switching frequency. But for applications with switching frequency higher than the preset minimal switching frequency, the fold back correction curve is over-action and the maximum power may not be available. For switching frequency lower than the preset minimal switching frequency, the fold back correction curve may have no use.

The fold back correction is currently implemented in one embodiment on current sense voltage. The limit of current sensing voltage changes with MOSFET ON-time based on the relation shown below in Equation (12):

$$V_{CS-\max}(t) = 1 - 0.54 * e^{\frac{t}{6us}} \quad (12)$$

In some embodiments during active burst mode operation, the current limit is implemented by setting the current sense voltage to 0.25V, 25% of the maximum current limit during normal operation. However, if a SMPS is designed with maximum MOSFET on time of 6 us, the maximum value of current sense voltage ($V_{CS}$) can be obtained from (12) and it is 0.80V. In some embodiments, a current sense resistor can be chosen according to the following equation:

$$R_{CS} = \frac{V_{cs-\max}}{I_{p-pk}} \quad (13)$$

Since the current sense voltage is still 0.25V in active burst mode operation, the actual maximum current limit is now around 32% of the maximum current limit during normal operation. This will increase the power for leaving active burst mode operation which may not be desirable.

When the output power decreases to a certain level, the ZC up/down counter will increase by 1. Since the switching frequency is decreased, the regulation voltage will increase at the same output power. Similarly, the regulation voltage will decrease when ZC up/down counter is decreased by 1.

In some embodiments, a higher threshold on regulation voltage, 3.2V, is used for decreasing the ZC up/down counter. A lower threshold on regulation voltage, 2.5V, is used for increasing the ZC up/down counter. This hysteresis may be used to ensure that the ZC up/down counter will not oscillate between two values to trigger an unstable condition that results in producing audio noise. An ideal condition is present when the maximal power at the $(n+1)^{th}$ ZC up/down counter is higher than the minimum power at the $n^{th}$ ZC up/down counter.

Conventional implementations of fold back corrections, may lead to unstable conditions. This is true for application where a SMPS is designed for wider range of input voltages such as 85VDC-375VDC. Assume a situation where the maximum ON time is set at 10 μs for an 85VDC input. In this case, with the same current limit, the maximum ON time at 375VDC would be 1.81 us. The maximum current sense voltage can be obtained from Equation (12) and it is 0.6V. Correspondingly, the regulation voltage for maximum output power would be 2.52V.

As a result, the maximum output power may be supplied at maximum $V_{REG}$=2.52V instead of 3.8V at $1^{st}$ ZC or 3.2V at other zero crossings. In this case, no overlap of the output power capability between the $(n+1)^{th}$ and the $n^{th}$ values of the up/down counter and SMPS will work at unstable condition.

In some embodiments, the foldback correction is implemented by limiting the maximum current even at the same regulation voltage. The objective is to achieve maximum output power at different input voltage, for the same ZC number and almost the same regulation voltage.

Figure 6:
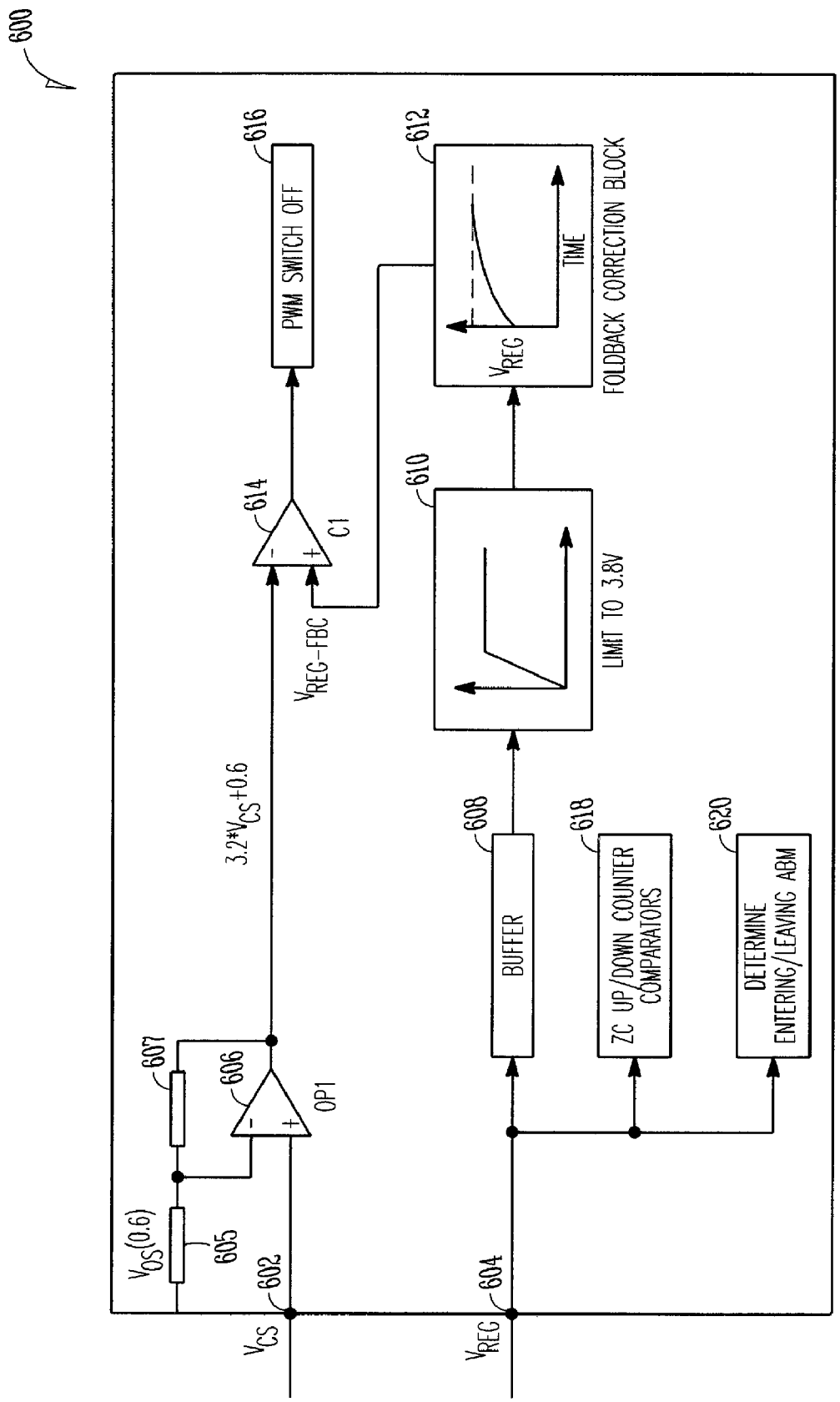
FIG. 6 shows an apparatus for providing fold back correction, according to an example embodiment.

FIG. 6 shows an apparatus 600 capable of providing fold back correction, according to some embodiments of the invention. In some embodiments, apparatus 600 includes an integrated circuit having includes pins 602 and 604 receiving voltages $V_{CS}$ and $V_{REG}$, respectively. In some embodiments, apparatus 600 includes operational amplifier 606, buffer 608, voltage limiting circuit 610, fold back correction circuit 612, pulse width modulator (PWM) comparator 614 and PWM module 616. In some embodiments, operational amplifier 606 includes two inputs. A first input is coupled to an offset voltage source and the second input is coupled to pin 602, such as through operational amplifier 606. In some embodiments, operational amplifier 606 receives a feedback signal from its output in conjunction with the offset voltage source impedances 605 and feedback impedance 607. Operational amplifier 606 is coupled to comparator 614. Pin 604 is coupled to buffer 608. Buffer 608 is coupled to voltage limiting circuit 610. Voltage limiting circuit 610 is in turn coupled to fold back correction circuit 612. An output of fold back correction circuit 612 is coupled to comparator 614. Output of PWM comparator 614 is provided to pulse width modulator 616. In some embodiments, PWM comparator 614 is included within the PWM module 616.

In some embodiments, the maximum current sense voltage at pin 602 is 1V for normal operation. A fixed foldback correction curve as shown in FIG. 5 may be used to limit the current sense voltage at active burst mode operation and the maximum value is 0.25V. The current sense voltage received from pin 602 is provided to one of the inputs of operational amplifier 606 and the other input of operational amplifier 606 is provided with an offset voltage. The output of operational amplifier 606 is provided as one of the inputs to PWM comparator 614. The other input, however, is not the original regulation voltage itself but a modified regulation voltage as described below.

In some embodiments, the utilization of regulation voltage can be divided into two parts: First, it is for ZC up/down counter settings and determination of active burst mode operation (the regulation voltage will be used directly in this part) and second, it is used for the operation of module PWM 616.

In the use of regulation voltage in PWM module 616, buffer 608 is used first for isolation. Then, a voltage limiting circuit 610 is provided so that a maximum regulation voltage of 3.8V will be resulted and the resulting voltage is termed as $V_{REG-lim}$ throughout this document. Voltage $V_{REG-lim}$ is provided into a fold back correction circuit 612. Fold back correction circuit 612 provides for integration and fold back correction based on a fold back correction curve shown in FIG. 5. The output of fold back correction circuit 612, is termed as $V_{REG-fbc}$ and is provided as the other input of the PWM comparator 614. Consequently, for the same regulation voltage, the maximum output power will be same because the maximum current limit will decrease when the MOSFET turn-ON time decreases.

In some embodiments, apparatus 600 includes a zero crossing counter circuit 618 coupled to pin 604 and adapted to receive voltage $V_{REG}$. In some embodiments, active burst mode (ABM) circuit 620 is coupled to pin 604 and adapted to receive voltage $V_{REG}$.

In some embodiments, the function of block 618 may be used to determine the value of ZC up/down counter, whose function has been described in paragraphs from [0025] to [0026].

In some embodiments, function block of 620 (ABM) may be added. The purpose of this block is for power saving at light load condition. Since regulation voltage will drop and ZC up/down counter will increase when the output load drops. The ABM block will monitor both regulation voltage and ZC up/down counter values. When ZC up/down counter is the preset highest value, the IC will go into ABM when regulation voltage is also lower than 1.1 V for a preset minimum period. During ABM, the converter will be operated in different manner from normal operation. In burst mode, the IC switches the MOSFET on and off for a period of time, which is called burst on. During burst on period, the switching frequency is fixed. The current limit is also fixed at one fourth of the maximum peak current in normal operation. The IC will also stop switch for another period of time, which is called burst off. The regulation voltage will determine whether the IC is in burst on or burst off period or leaving ABM.

Figure 7:
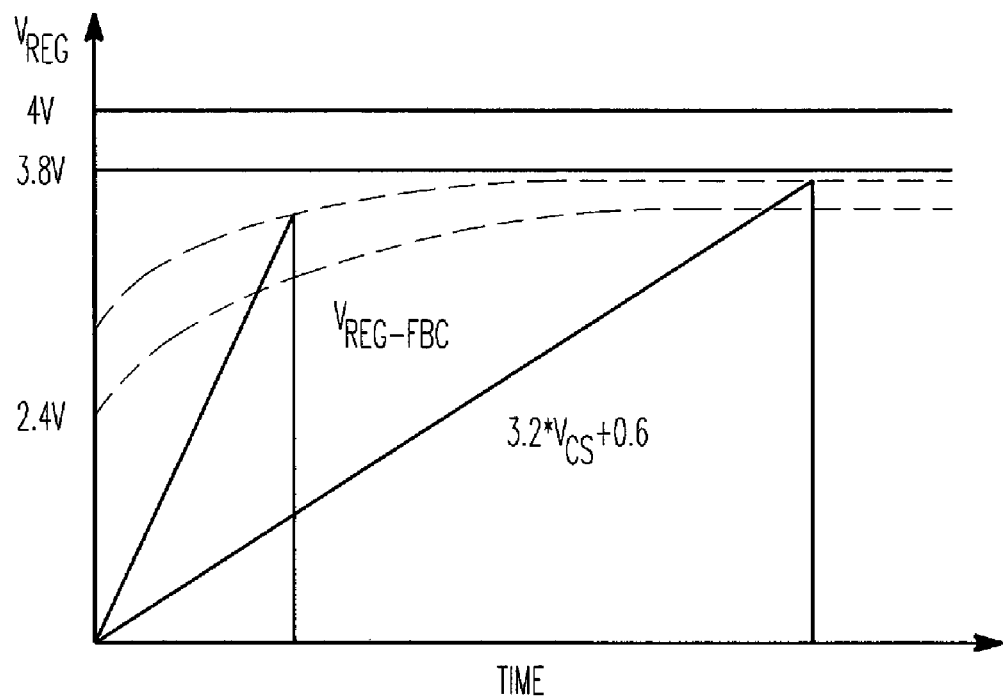
FIG. 7 illustrates a set of waveforms showing voltages present at various locations within the apparatus shown in FIG. 6 when $V_{REG}$ is higher than 3.8V, according to an example embodiment.

FIG. 7 illustrates a set of waveforms showing voltages present at various locations within the apparatus shown in FIG. 6 when $V_{REG}$ is higher than 3.8V, according to some embodiments of the invention.

In FIG. 7, since $V_{REG}$ is higher than 3.8V, $V_{REG\text{-}lim}$ is limited to 3.8V as black curve shown in FIG. 7. Correspondingly, the $V_{REG\text{-}fbc}$ has an ultimate value of 3.8V and time constant of 6 us. When the gate is turned on, the $V_{REG}$-fbc at this condition increase when MOSFET is on, which is described as $$V_{REG-fbc}(t) = V_{REG-\lim}\left(1 - 0.54 * e^{\frac{t}{6us}}\right) \quad (14)$$

In this example, since input voltage is high, the current sense voltage increases very fast and the resulting maximum current will be limited by the regulation voltage $V_{REG\text{-}fbc}(t)$.

Figure 8:
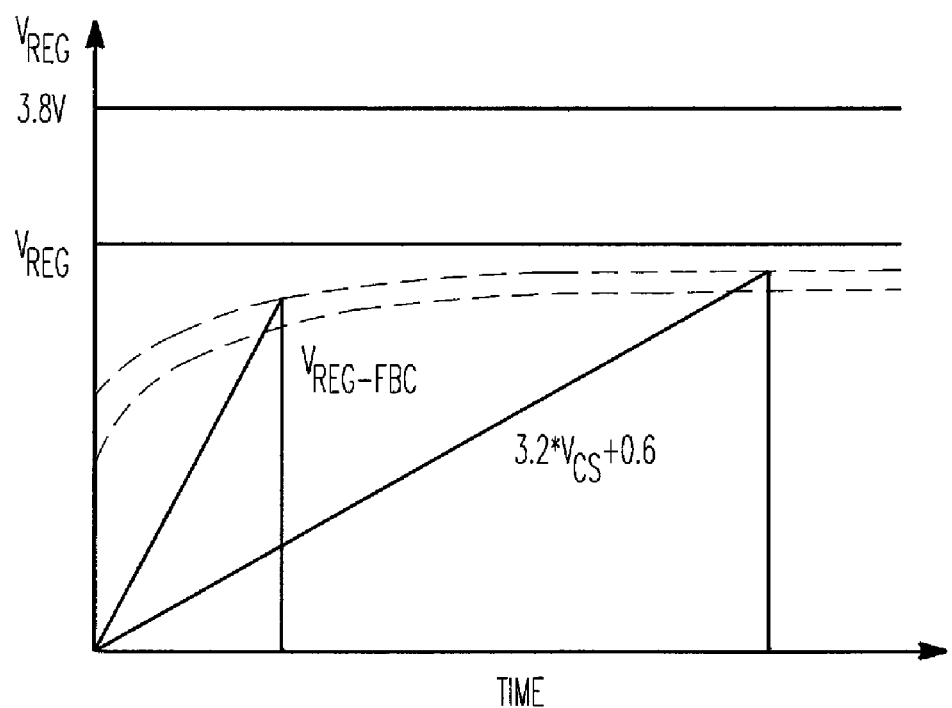
FIG. 8 illustrates a set of waveforms showing voltages present at various locations within the apparatus shown in FIG. 6 when $V_{REG}$ is lower than 3.8V, according to an example embodiment.

FIG. 8 illustrates a set of waveforms showing voltages present at various locations within the apparatus shown in FIG. 6 when $V_{REG}$ is lower than 3.8V, according to some embodiments of the invention.

In this example, $V_{REG}$ is lower than 3.8V and the input voltage is high. Since $V_{REG}$ is lower than 3.8V, $V_{REG\text{-}lim}$, is not influenced by the limitation circuit and it is equal to $V_{REG}$. Therefore, $V_{REG\text{-}fbc}$ will be an exponential function with ultimate value of $V_{REG}$ as shown in FIG. 9.

Figure 9:
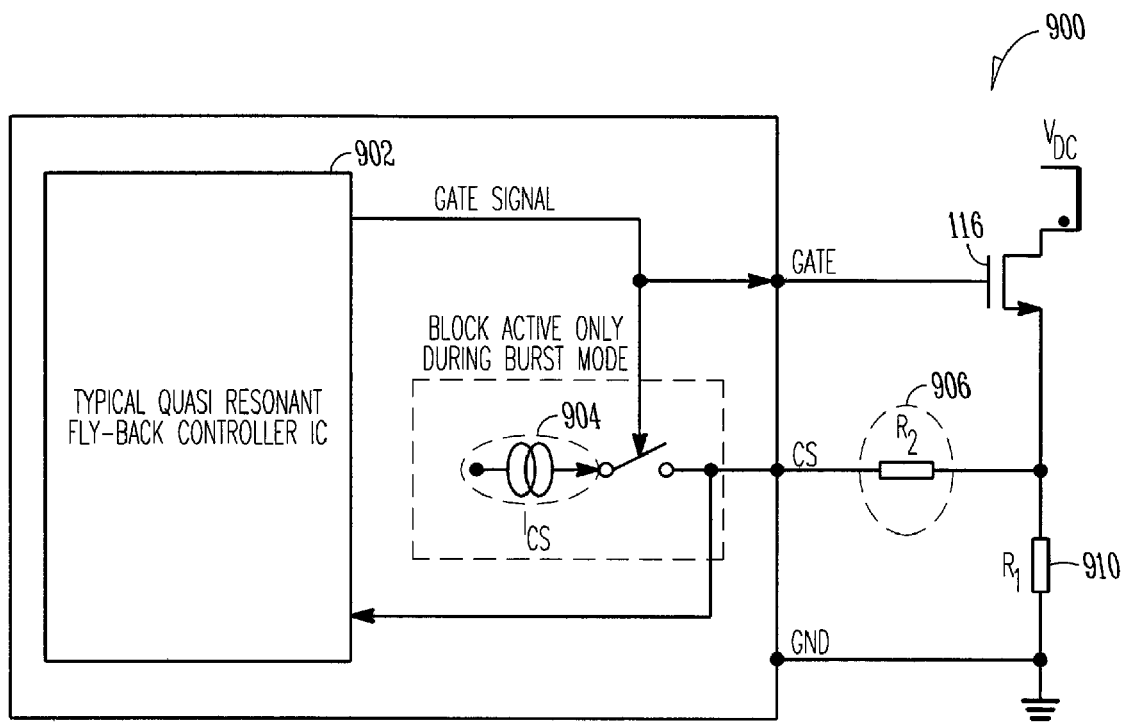
FIG. 9 illustrates a block diagram of a quasi resonant fly-back converter control IC, according to an example embodiment.

FIG. 9 illustrates a block diagram of a system 900 showing a quasi resonant fly-back converter 902, according to some embodiments of the invention.

In conventional quasi-resonant flyback converter controller ICs, the power at which the IC exits burst mode is not adjustable because both the burst mode current limit and burst switching frequency are fixed internally. This can be seen from Equation (5) which describes the input power into the converter. During burst mode, the switching frequency is fixed and the gate 116 turn-off is also determined by a fixed drain current value. Hence, the input power and in turn the output power in burst mode operation is only proportional to the ratio of the burst on time over the burst period. The maximal power is available when the ratio is at its maximum of 1.

Additionally, selection of the switching frequency at burst mode operation is critical. In case of an improper selected value, problem may be caused. In applications using high switching frequencies during normal operation, the power for leaving the active burst mode may be too low. In extreme case, it may be lower than the power for entering the active burst mode. This may cause unstable operation because of the continuous changing between normal and burst mode operation. On the other hand, for applications using low switching frequencies in normal operation, the power for leaving active burst mode may be too high and the converter may work in burst mode with quite high load. This is also undesirable. To solve the above mentioned problem different switching frequency in active burst mode can be used for different applications. However, this method can not be used in IC approach.

As shown in FIG. 9, a resistor 906, $R_2$ is added between a pin CS and resistor $R_1$ indicated at 910. To select different maximum power during active burst mode, different values of resistor R2 may be used. During switch-on period of burst mode, current from constant current source 904 will flow out of pin CS through resistor $R_2$. As a result, an additional offset is added to the voltage seen at the pin $V_{cs}$. With a higher value of $R_2$, the offset is larger, and it will reach the fixed voltage $V_{reg}$ earlier, and in turn, the pulse width of gate is shorter, as in FIG. 2. As a result, the power delivered is smaller. In this way, the power at which the IC exits burst mode is adjustable by an external resistor.

Furthermore, the current limit during active burst mode will be chosen according to the highest switching frequency in normal operation. The power for leaving active burst mode will be higher than the one for entering active burst mode. In case of low switching frequency applications, a customer can add $R_2$ and adjust the resistance so that they can get acceptable power for leaving active burst mode.

With such a solution, a single integrated circuit can cover all the applications with different switching frequencies in normal operation. Additionally, by using the CS pin, an adjustable maximum burst mode power may be implemented. In some embodiments, the maximum power during active burst mode can be achieved by using an additional resistor and constant current source for the selection function. Moreover, the user can freely select their preferred power at which the IC would leave the active burst mode based upon the application in hand. It also allows for the possibility of producing one IC to cover different applications.

In some embodiments of the invention, the power during active burst mode can be adjusted externally by attaching a resistor to the current sense (CS) pin. By using this method, the preferred power at which the IC gets out of the burst mode can be controlled is user definable.

Figure 10:
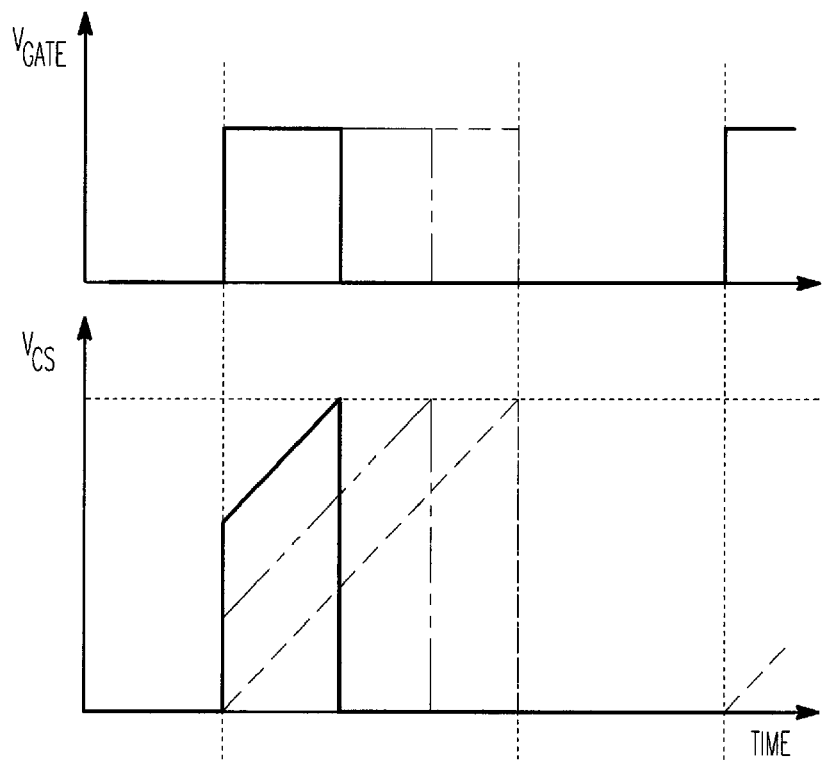
FIG. 10 illustrates waveforms of voltages $V_{CS}$ and $V_{GATE}$ for different resistance values for R2 shown in FIG. 9, according to an example embodiment.

FIG. 10 illustrates voltage waveforms $V_{CS}$ and $V_{GATE}$ for different resistance values for R2 shown in FIG. 9, according to some embodiments of the invention.

Figure 11:
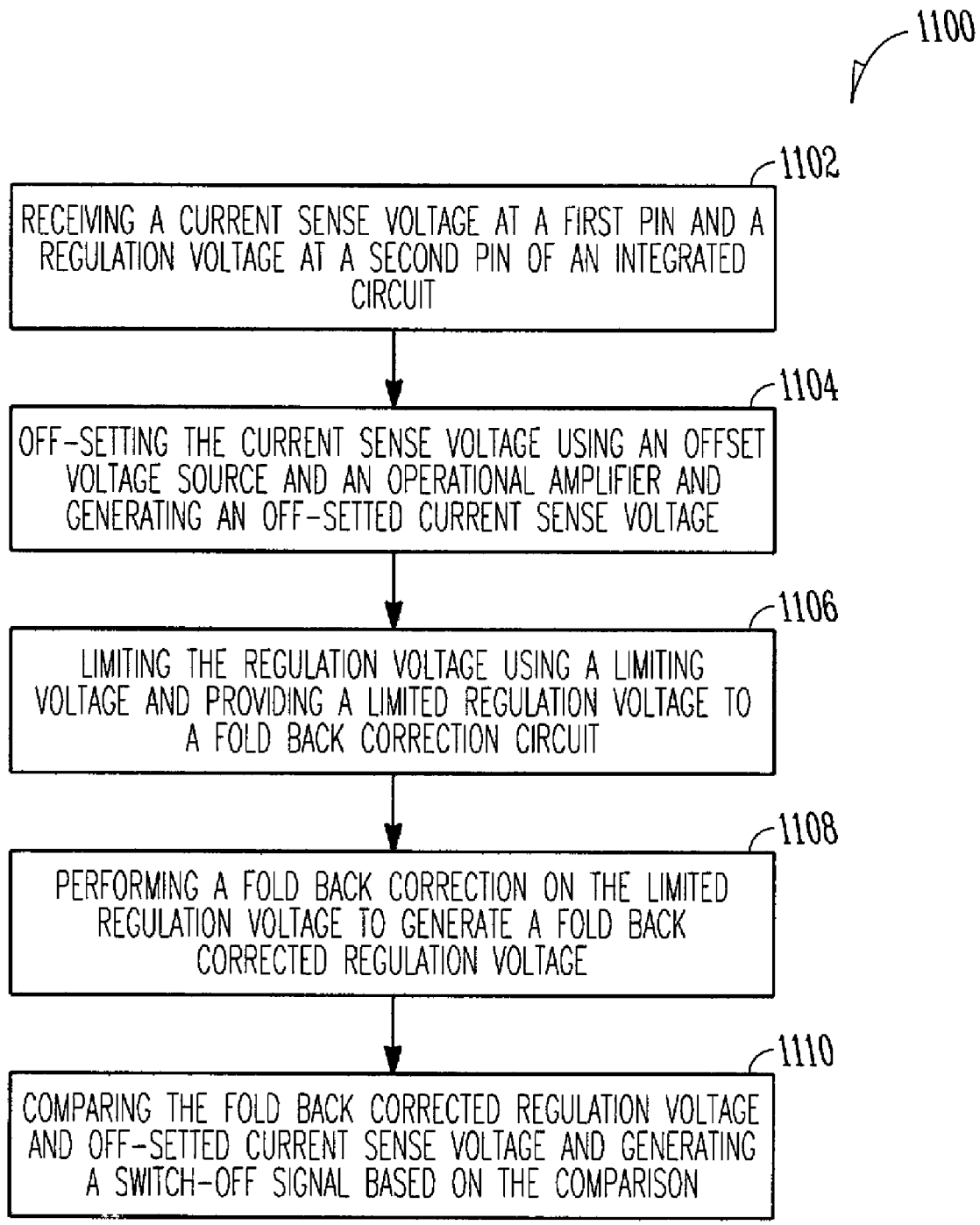
FIG. 11 is a flow chart illustrating a method of regulating power in a flyback converter, according to an example embodiment.

FIG. 11 shows a flow chart illustrating a method 1100 of regulating power in a flyback converter, according to some embodiments of the invention.

At 1102, method 1100 proceeds by receiving a current sense voltage at a first pin and a regulation voltage at a second pin of an integrated circuit.

At 1104, the current sense voltage is offset using an offset voltage source and an operational amplifier and generating an off-setted current sense voltage.

At 1106, the regulation voltage is limited by using a limiting voltage and providing a limited regulation voltage to a fold back correction circuit.

At 1108 a fold back correction is performed on the limited regulation voltage to generate a fold back corrected regulation voltage.

At 1110, method 1100 proceeds by comparing the fold back corrected regulation voltage and the off-setted current sense voltage. Additionally, method 1100 includes generating a switch-off signal may be generated based on the comparison.

In some embodiments, method 1100 includes performing a zero crossing count on the regulation voltage. In some embodiments, method 1100 includes determining the entry into an active burst mode based on the regulation voltage. In some embodiments, method 1100 includes determining the departure from the active burst mode based on the regulation voltage.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. In the previous discussion and in the claims, the terms "including" and "comprising" are used in an open-ended fashion, and thus should be interpreted to mean "including, but not limited to . . . ".

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An integrated circuit, comprising:
an operational amplifier configured to receive a current sense voltage ($V_{CS}$) at a first input and an offset voltage at a second input;
a comparator coupled to the operational amplifier and adapted to receive at a first input an output voltage signal ($V_{OUT}$) of the operational amplifier;
a voltage limiting circuit configured to receive a regulation voltage;
a fold back correction circuit coupled to the voltage limiting circuit, the foldback correction circuit coupled to a second input of the comparator; and
a pulse width modulator circuit coupled to the comparator and adapted to receive the output of the comparator.

2. The integrated circuit of claim 1, wherein the output voltage signal of the operational amplifier is given by the relation:

$$V_{OUT}=3.2*V_{CS}+0.6.$$

3. The integrated circuit of claim 2, wherein the voltage limiting circuit is configured to limit the regulation voltage to 3.8 Volts.

4. The integrated circuit of claim 1, further comprising a buffer coupled to the voltage limiting circuit and adapted to receive the regulation voltage.

5. The integrated circuit of claim 1, further comprising a zero crossing counter circuit adapted to receive the regulation voltage.

6. The integrated circuit of claim 1, wherein the pulse width modulator circuit generates a switch-off signal based on the output of the comparator that is used to turn-off a switch.

7. The integrated circuit of claim 6, wherein the switch including a MOSFET.

8. The integrated circuit of claim 1, further comprising an active burst mode circuit adapted to receive the regulation voltage.

9. A method, comprising:
receiving a current sense voltage at a first pin and a regulation voltage at a second pin of an integrated circuit;
off-setting the current sense voltage using an offset voltage source and an operational amplifier and generating an off-setted current sense voltage;
limiting the regulation voltage using a limiting voltage and providing a limited regulation voltage to a fold back correction circuit;
performing a fold back correction on the limited regulation voltage to generate a fold back corrected regulation voltage;
comparing the fold back corrected regulation voltage and the off-setted current sense voltage; and
generating a PWM switch-off signal based on comparing the fold back regulation voltage and the off-setted current sense voltage.

10. The method of claim 9, further comprising:
performing a zero crossing count on the regulation voltage.

11. The method of claim 9, further comprising:
determining the entry into an active burst mode based on the regulation voltage.

12. The method of claim 11, further comprising:
determining the departure from the active burst mode based on the regulation voltage.

13. A circuit comprising:
means for receiving a current sense voltage at a first pin and a regulation voltage at a second pin of an integrated circuit;
means for off-setting the current sense voltage using an offset voltage source and an operational amplifier and generating an off setted current sense voltage;
means for limiting the regulation voltage using a limiting voltage and providing a limited regulation voltage to a fold back correction circuit;
means for performing a fold back correction on the limited regulation voltage to generate a fold back corrected regulation voltage;
means for comparing the fold back corrected regulation voltage and the off-setted current sense voltage; and
means for generating a PWM switch-off signal based on comparing the fold back regulation voltage and the off setted current sense voltage.

14. The circuit of claim 13, further comprising:
means for determining the entry into an active burst mode based on the regulation voltage.

15. The circuit of claim 13, further comprising:
means for determining the departure from the active burst mode based on the regulation voltage.

16. The circuit of claim 13, further comprising:
means for performing a zero crossing count on the regulation voltage.

17. A system comprising:
a flyback controller circuit configured to provide a switching signal used to activate a switch;
a current source coupled to the flyback controller circuit and configured to be operational during a burst mode based on the switching signal; and
a resistive load coupled to the current source at one end and the switch at the other end, wherein the flyback controller circuit comprising:
an operational amplifier configured to receive a current sense voltage ($V_{CS}$) at a first input and an offset voltage at a second input;
a comparator coupled to the operational amplifier and adapted to receive at a first input an output voltage signal ($V_{OUT}$) of the operational amplifier;
a current limiting circuit configured to receive a regulation voltage;
a fold back correction circuit coupled to the current limiting circuit, the foldback correction circuit coupled to a second input of the comparator; and
a pulse width modulator circuit coupled to the comparator and adapted to receive the output of comparator.

18. The system of claim 17, wherein the switch includes a MOSFET.

19. The system of claim 17, further comprising a zero crossing counter circuit adapted to receive the regulation voltage.

* * * * *

UNITED STATES PATENT AND TRADEMARK OFFICE
CERTIFICATE OF CORRECTION

PATENT NO. : 7,742,320 B2  Page 1 of 1
APPLICATION NO. : 11/745089
DATED : June 22, 2010
INVENTOR(S) : Jing Hu et al.

It is certified that error appears in the above-identified patent and that said Letters Patent is hereby corrected as shown below:

In column 10, line 47, in Claim 13, delete "off setted" and insert -- off-setted --, therefor.

In column 10, lines 57–58, in Claim 13, delete "off setted" and insert -- off-setted --, therefor.

Signed and Sealed this

Nineteenth Day of October, 2010

David J. Kappos
*Director of the United States Patent and Trademark Office*